(12) United States Patent
Wang et al.

(10) Patent No.: US 11,440,740 B2
(45) Date of Patent: Sep. 13, 2022

(54) FRICTIONAL FORCE MONITORING SYSTEM FOR MIDDLE TROUGHS OF SCRAPER CONVEYOR

(71) Applicant: China University of Mining and Technology, Jiangsu (CN)

(72) Inventors: Dagang Wang, Jiangsu (CN); Ruixin Wang, Jiangsu (CN); Zhencai Zhu, Jiangsu (CN); Huilong Zhu, Jiangsu (CN); Gang Shen, Jiangsu (CN); Xiang Li, Jiangsu (CN); Yu Tang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/418,853

(22) PCT Filed: Nov. 26, 2019

(86) PCT No.: PCT/CN2019/120832
§ 371 (c)(1),
(2) Date: Jun. 28, 2021

(87) PCT Pub. No.: WO2020/177405
PCT Pub. Date: Sep. 10, 2020

(65) Prior Publication Data
US 2022/0073283 A1   Mar. 10, 2022

(30) Foreign Application Priority Data
Mar. 7, 2019   (CN) .......................... 201910170855.1

(51) Int. Cl.
*B65G 43/00*   (2006.01)
*B65G 19/28*   (2006.01)
(Continued)

(52) U.S. Cl.
CPC ............. *B65G 43/00* (2013.01); *B65G 19/28* (2013.01); *B65G 47/76* (2013.01); *G01K 13/00* (2013.01); *G01L 5/16* (2013.01); *G01N 19/02* (2013.01)

(58) Field of Classification Search
CPC ........ B65G 43/00; B65G 19/28; B65G 47/76; G01K 13/00; G01L 5/16; G01N 19/02
See application file for complete search history.

(56) References Cited

U.S. PATENT DOCUMENTS

| | | | | |
|---|---|---|---|---|
| 4,722,218 | A * | 2/1988 | Strader .................. | G01N 19/02 73/9 |
| 2016/0041086 | A1* | 2/2016 | Jacques .................. | G01N 19/02 73/9 |

FOREIGN PATENT DOCUMENTS

| | | |
|---|---|---|
| CN | 104609133 | 5/2015 |
| CN | 106865156 | 6/2017 |

(Continued)

OTHER PUBLICATIONS

"International Search Report (Form PCT/ISA/210) of PCT/CN2019/120832", dated Feb. 20, 2020, with English translation thereof, pp. 1-5.

(Continued)

*Primary Examiner* — William R Harp
(74) *Attorney, Agent, or Firm* — JCIPRNET

(57) ABSTRACT

A frictional force monitoring system for middle troughs of a scraper conveyor, comprising a scraper conveyor system and a sensing detection system. The scraper conveyor system consists of a machine body, middle troughs, thrust lugs, scrapers, a double chain, a sprocket, a speed reducer, an electric motor and a frequency converter. The sensing monitoring system consists of force receiving modules, a three-dimensional force sensor, and a pre-embedded temperature sensor. The frictional force monitoring system is able to
(Continued)

monitor impact loads, frictional forces, friction coefficients, temperature, etc. between an annular chain, coal bulk, and middle troughs of the scraper conveyor under complex and severe operating conditions, and to provide the technical means for the design, safety early-warning and health evaluation of the scraper conveyor, and can provide a data basis for studying friction wear and fatigue breaking mechanism of middle troughs of a scraper machine.

4 Claims, 3 Drawing Sheets

(51) Int. Cl.
  *B65G 47/76* (2006.01)
  *G01K 13/00* (2021.01)
  *G01L 5/16* (2020.01)
  *G01N 19/02* (2006.01)

(56) References Cited

FOREIGN PATENT DOCUMENTS

| | | |
|---|---|---|
| CN | 106931870 | 7/2017 |
| CN | 107082228 | 8/2017 |
| CN | 107202706 | 9/2017 |
| CN | 110040467 | 7/2019 |
| JP | 2001026313 | 1/2001 |
| RU | 2051850 | 1/1996 |

OTHER PUBLICATIONS

"Written Opinion of the International Searching Authority (Form PCT/ISA/237) of PCT/CN2019/120832", dated Feb. 20, 2020, with English translation thereof, pp. 1-8.

* cited by examiner

FRICTIONAL FORCE MONITORING SYSTEM FOR MIDDLE TROUGHS OF SCRAPER CONVEYOR

CROSS-REFERENCE TO RELATED APPLICATION

This application is a 371 of international application of PCT application serial no. PCT/CN2019/120832, filed on Nov. 26, 2019, which claims the priority benefit of China application no. 201910170855.1, filed on Mar. 7, 2019. The entirety of each of the above mentioned patent applications is hereby incorporated by reference herein and made a part of this specification.

BACKGROUND OF THE INVENTION

Field of the Invention

The present invention belongs to the field of scraper conveyor test technologies; and relates to a frictional force monitoring system for middle troughs of a scraper conveyor, and in particular, to a multi-point frictional force monitoring system for middle troughs of a scraper conveyor under complex and severe operating conditions.

Description of Related Art

A scraper conveyor, as the key conveying apparatus of the fully mechanized mining face in a coal mine, is responsible for the important tasks of transporting coal, providing running tracks for a coal mining machine, and providing moving fulcrums for a hydraulic support. Based on a chain transmission principle and driven by a drive motor, a hydraulic coupler, and a speed reducer, the scraper conveyor uses a scraper chain (including an annular chain, scrapers, and a chain spanner) and middle troughs respectively as a dragging mechanism and a support mechanism; and a sprocket drives the infinitely closed scraper chain to make continuous cyclic motion in the middle troughs, to transport coal in the middle troughs from the machine tail to the machine head and then discharge the coal. During operation of the scraper conveyor, there is relative motion between a linear segment of the annular chain and the middle troughs. Further, a transmission polygon effect between the sprocket and the annular chain, frequent startup or shutdown in the case of a full load or overload, and abnormal loads such as rib fall and collapse of the coal wall may all cause impact contact characteristics between the annular chain and the middle troughs and time-varying tension characteristics of the annular chain. Therefore, the impact contact and the relative motion between the annular chain and the middle troughs and a coupling effect of the time-varying tension result in friction fatigue between the annular chain and the middle troughs, triggering friction wear of the annular chain and the middle troughs and fatigue crack growth. When the wear exceeds the limit or the crack extends to a certain extent, the chain can no longer withstand the dynamic load, causing a chain breakage accident. Thus, dynamic real-time monitoring of parameters such as the dynamic contact load, frictional force, and friction coefficient between the annular chain, coal bulk and particles, and the middle troughs during operation of the scraper machine can lay a parameter basis for revealing friction wear and fatigue breaking mechanism of the annual chain and the middle troughs; and is of great significance to ensure the reliable operation of the scraper conveyor, to increase the operation rate of a complete set of fully mechanized mining equipment, and to improve the production efficiency of a large coal mine.

However, the fully mechanized mining face of a coal mine is always in complex and severe conditions, such as a high temperature, coal dust, water leakage and mine water, and the scraper conveyor is frequently subjected to the impact from falling coal blocks, resulting in inconvenient arrangement and maintenance of various monitoring apparatuses (for example, an opening and damage must not be made to the annular chain to mount a sensor or strain test device, because the effects between the annular chain, coal, and the middle troughs and between the annular chain and the sprocket and the infinitely closed scraper chain may damage the measurement device, and the damage to the annular chain causes a decrease in the bearing capacity of the annular chain, degrading the transport capacity. If a non-contact measurement device is used, the severe operating conditions of the scraper conveyor may damage the measurement device or hinder measurement). Moreover, during mining, uneven control of the coal mining output easily leads to overload of the scraper conveyor and even causes the phenomenon of slipping and crushing, bringing a huge safety hazard to the safety production of the coal mine. Therefore, solving the problems of poor functionality, lack of real-time performance, and failure to monitor and analyze friction wear data of the middle troughs of the scraper conveyor in the existing monitoring technology for the middle troughs of the scraper conveyor is of great significance to understand the working conditions during the operation of the scraper conveyor, to monitor the friction information between the annular chain, the coal bulk, and the middle troughs in real time, and to reveal a failure mechanism of the annular chain and the middle troughs.

Chinese patent No. CN104609133A discloses a method and system for detecting wear of middle plates of middle troughs of a scraper conveyor, where the method can realize monitoring of the wear. However, this method can only qualitatively monitor whether the middle trough is worn but is unable to monitor the frictional force between the middle trough of the scraper conveyor and the coal bulk under the working conditions of dynamic load or impact load.

Chinese patent No. CN106865156A discloses a device and system for detecting wear of middle troughs of a scraper conveyor, where the device can use ultrasonic waves to detect the wear of the middle troughs. However, this device determines the wear status only by monitoring the thickness of the middle trough with ultrasonic waves, but cannot monitor the frictional force during operation of the scraper conveyor. Further, due to adhesion of pulverized coal in an underground environment, a great error may be made in monitoring the thickness of the middle trough with the ultrasonic waves.

Therefore, a system for monitoring the frictional force between the annular chain, the coal bulk, and the middle troughs of the scraper conveyor under complex and severe operating conditions has not yet been reported.

SUMMARY OF THE INVENTION

Technical Problem

To solve the problems in the background, the present invention provides a frictional force monitoring system for middle troughs of a scraper conveyor. The system is able to monitor impact loads, frictional forces, friction coefficients, temperature, etc. between an annular chain, coal bulk, and middle troughs of the scraper conveyor under complex and severe operating conditions, and to provide the technical means for the design, safety early-warning and health evaluation of the scraper conveyor, and can provide a data basis for studying friction wear and fatigue breaking mechanism of the middle troughs of a scraper machine.

The objective of the present invention is achieved as follows:

Technical Solution

A frictional force monitoring system for middle troughs of a scraper conveyor is provided, wherein in each of the middle troughs of the scraper conveyor, three rectangular through holes are provided at equal intervals along a running direction with a central line of the middle trough as the reference, a line mounting hole is made at the bottom of the middle trough but does not penetrate the middle trough, and the provided rectangular through holes are communicated with the line mounting hole.

A rectangular force receiving module is mounted in each of the rectangular through holes and matches the rectangular through hole in shape, and an upper surface of the rectangular force receiving module coincides with an upper surface of the middle trough.

A three-dimensional force sensor is disposed between the force receiving module and the bottom of the middle trough, a counterbore is provided in the upper surface of each of the force receiving modules, and the force receiving module is connected to the three-dimensional force sensor at the bottom via a hexagon bolt in the counterbore; a sealing cap is disposed on the top of the counterbore, and an upper surface of the sealing cap coincides with an upper surface of the force receiving module.

A temperature sensor is pre-embedded in each of the force receiving modules.

A controller is in signal connection with the three-dimensional force sensor and the temperature sensor via a data acquisition card.

By means of such multi-point interconnected monitoring, thermal and force data about the middle trough during operation of the scraper conveyor is obtained in real time, and a fault position in the scraper machine is determined according to exceptional data in the following manner:

numbering each group of sensing devices and marking their positions; and based on tangential friction forces measured by the three-dimensional force sensor and temperature data measured by the pre-embedded temperature sensor, if data is excessively large or small at a certain position, determining, by the system according to the number and position of a data exception group, that the scraper conveyor has a fault at this position.

According to data monitored by the multiple arranged force receiving modules, an overall load capacity, overall frictional force, and average friction coefficient of the scraper machine, and the temperature of a friction surface of the middle trough are calculated by using a computer in the following calculation manner:

A calculation formula of the overall frictional force is as follows:

$$F \sum_{x=1}^{n} \frac{s*(f_{x1}+f_{x2}+f_{x3})}{3s_1}$$

wherein:
F denotes the overall frictional force;

n denotes the number of the segments of the scraper machine;
s denotes an effective conveying area of each of the segments of the scraper machine;
$s_1$ denotes the area of each of the force receiving modules; and
$f_{x1}$, $f_{x2}$, and $f_{x3}$ denote tangential friction forces output by the three-dimensional force sensor.

A calculation formula of the overall load capacity is as follows:

$$M = \sum_{x=1}^{n} \frac{s*(F_{x1}+F_{x2}+F_{x3})}{3s_1 * g}$$

wherein:
M denotes the overall load capacity;
n denotes the number of the segments of the scraper machine;
s denotes an effective conveying area of each of the segments of the scraper machine;
$s_1$ denotes the area of each of the force receiving modules; and
$F_{x1}$, $F_{x2}$, and $F_{x3}$ denote positive pressures output by the sensor.

The average friction coefficient is calculated as follows:

$$\mu = \frac{F}{Mg}.$$

The calculated temperature of the friction surface is an average value of temperatures measured by all the pre-embedded temperature sensors.

The force receiving module is a rectangular steel block having the same material as the middle trough.

A scraper conveyor system includes scrapers, a double chain, a sprocket, a speed reducer, an electric motor, and a frequency converter, wherein the frequency converter is connected to the electric motor; the speed reducer is connected between the electric motor and the sprocket; the sprocket engages with the double chain; and the scrapers are mounted on an upper surface of the double chain at equal intervals.

The frequency converter is electrically connected to the controller.

Advantageous Effect

The present invention can monitor a friction status of middle troughs of a scraper conveyor in real time by using a three-dimensional force sensor and a pre-embedded temperature sensor. By means of such multi-point interconnected monitoring, thermal and force data about each of the middle troughs during operation of the scraper conveyor can be obtained in real time, and a fault position in a scraper machine can be determined according to exceptional data by using numbered sensing devices. When the scraper machine is overloaded or the temperature of a friction surface of the middle trough is abnormal, a PLC control system controls a frequency converter 13 to stop operation of an electric motor 8. In addition, operation health evaluation can be performed on the scraper machine by using the calculated friction coefficient. When the friction coefficient or its fluctuation range is relatively large, it indicates that the working conditions of the middle trough are relatively severe, and overhaul or replacement is timely required for the middle trough of the scraper machine, so as to prevent a working accident.

Moreover, the overall load capacity, the overall frictional force, and the friction coefficient of the scraper machine, and the temperature of the friction surface of the middle trough can be calculated by using a computer, thus establishing an overload protection system, realizing operation health evaluation on the scraper machine, and providing a data basis for studying friction wear and fatigue breaking mechanism of the middle troughs of the scraper machine.

Meanings of numerals: 1. Force receiving module, 2. Thrust lug, 3. Scraper, 4. Double chain, 5. Middle trough, 6. Speed reducer, 7. Sprocket, 8. Electric motor, 9. Machine body, 10. Counterbore sealing cap, 11. Temperature sensor, 12. Three-dimensional force sensor, and 13. Frequency converter

DETAILED DESCRIPTION OF THE INVENTION

The present invention is further described below with reference to the accompanying drawings.

Figures 1, 2, 3:
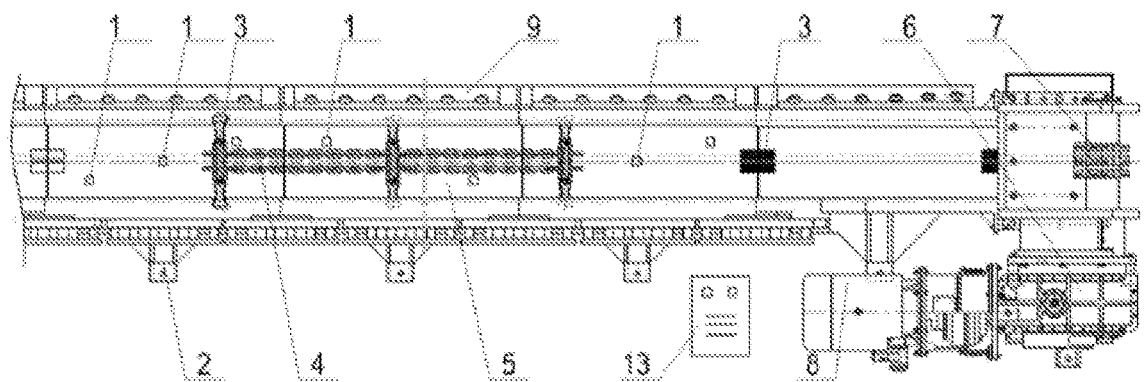
FIG. 1 is a schematic structural diagram of a testbed of the present invention.
FIG. 2 is a front view of FIG. 1.
FIG. 3 is an A-direction sectional diagram of FIG. 2.

As shown in FIG. 1, a frictional force monitoring system for middle troughs of a scraper conveyor is provided, which includes a scraper conveyor system and a sensing detection system. The scraper conveyor system consists of a machine body, middle troughs, thrust lugs, scrapers, a double chain, a sprocket, a speed reducer, an electric motor, and a frequency converter. The sensing monitoring system consists of force receiving modules, a three-dimensional force sensor, and a pre-embedded temperature sensor.

The frequency converter 13 is connected to the electric motor 8, the speed reducer 6 is connected between the electric motor 8 and the sprocket 7, and the sprocket 7 engages with the double chain 4. The scrapers 3 are mounted on the double chain 4 at equal intervals. Three rectangular through holes in total are made respectively in the middle and two sides of each of the middle troughs 5 of a scraper machine.

As shown in FIGS. 2 and 3, the force receiving modules 1 are respectively disposed in the rectangular through holes, and their upper surfaces coincide with the upper surface of the middle trough 5. The force receiving module 1 is connected to the three-dimensional force sensor 12 which is fixed on the bottom of the middle trough 5.

Figure 4:
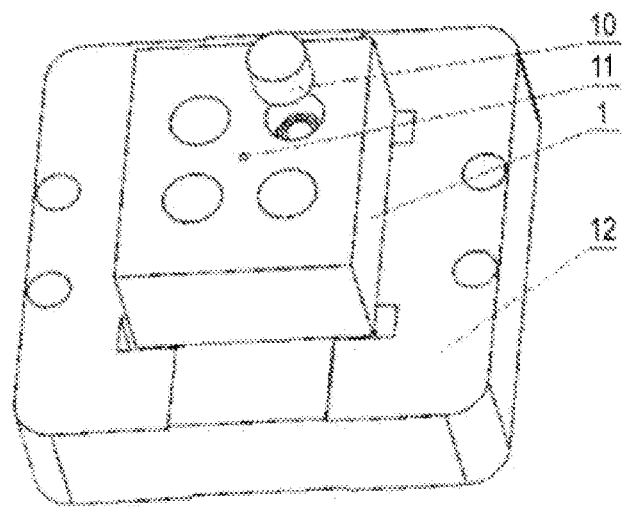
FIG. 4 is a schematic structural diagram showing connection between a rectangular force receiving module and a force receiving module of the present invention.

Further with reference to FIG. 4, a sensing monitoring device is composed of the three-dimensional force sensor 12, the pre-embedded temperature sensor 11, and the force receiving module 1. The pre-embedded temperature sensor 11 is mounted inside the force receiving module 1. A counterbore is provided in the upper surface of the force receiving module 1, and the force receiving module 1 is connected to the three-dimensional force sensor 12 via a hexagon bolt in the counterbore. A counterbore sealing cap 10 is connected in the counterbore, and its upper surface coincides with the upper surface of the force receiving module 1.

Figure 5:
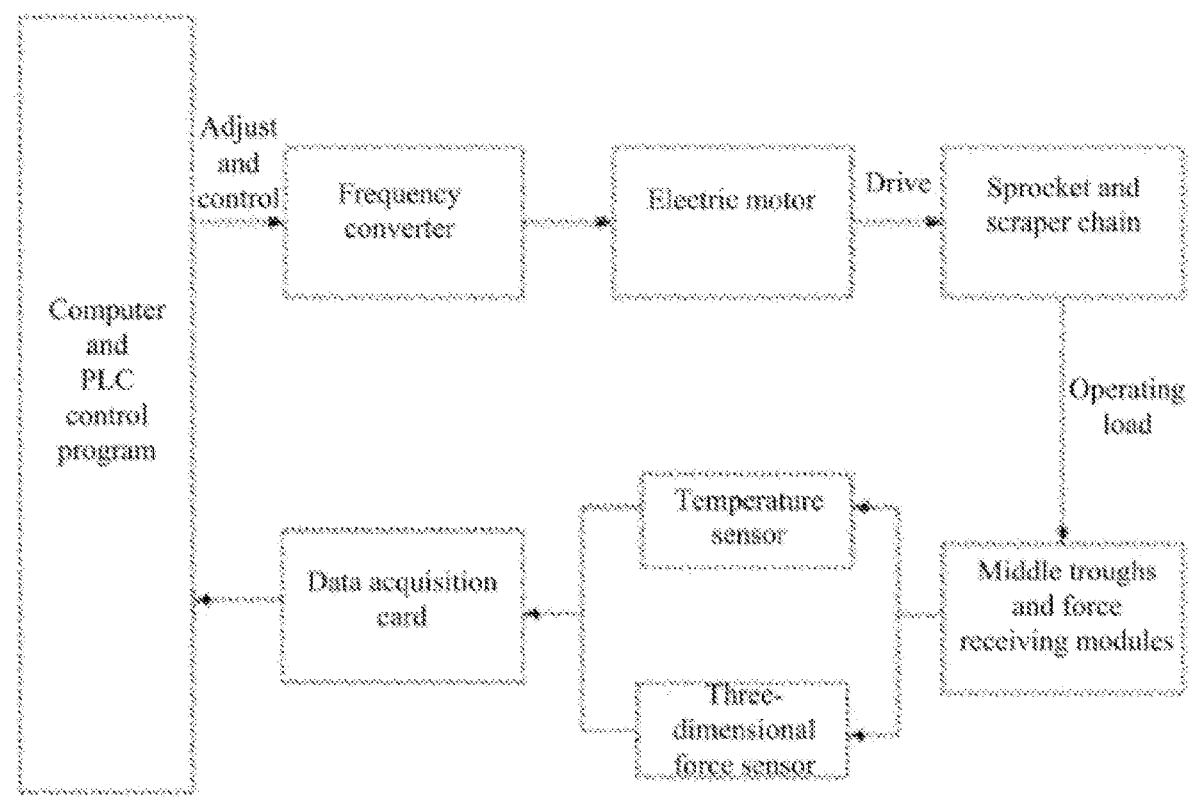
FIG. 5 is a working principle diagram of the present invention.
Figure 6:
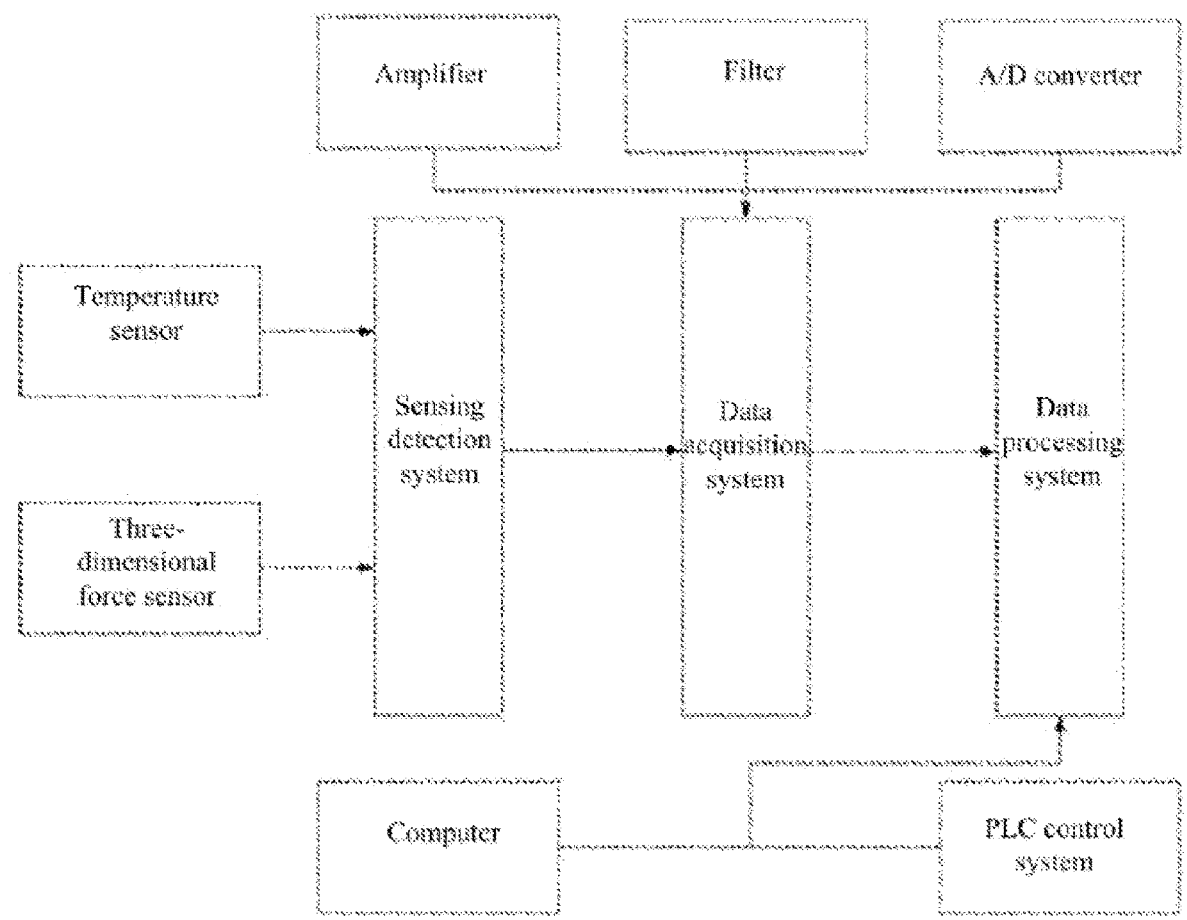
FIG. 6 is a schematic structural diagram of a test system of the present invention.

Further with reference to FIGS. 5 and 6, the electric motor 8 is adjusted and controlled by using a computer and a PLC control system, to control startup and shutdown. The electric motor 8 drives the speed reducer 6. Because an output of the speed reducer 6 is connected to the sprocket 7, the speed reducer drives the sprocket 7 and the double chain 4 to run, and thus the scraper conveyor starts to work. The pre-embedded temperature sensor 11 is used to monitor a dynamic temperature change of the middle trough during operation of the scraper machine, and the three-dimensional force sensor 12 is used to monitor dynamic changes in the frictional force and positive pressure during operation of the scraper machine. The monitored data is subjected to filtering, amplification, and conversion by a data acquisition system formed by a filter, an A/D converter, and an amplifier; and is then transmitted to a data processing system. After data processing, data about the temperature, frictional force, and positive pressure of the middle troughs during operation of the scraper conveyor, and their dynamic changes with the operating time can be obtained.

In each of the segments of the scraper machine, three rectangular through holes are provided respectively in the middle and two sides along a running direction and used to accommodate the sensing monitoring system. By means of such multi-point interconnected monitoring, thermal and force data about the middle trough during operation of the scraper conveyor can be obtained in real time, and a fault position in the scraper machine can be determined according to exceptional data. Each of the force receiving modules has an area of 60 mm×70 mm. According to data monitored by the multiple arranged force receiving modules, an overall load capacity, overall frictional force, and average friction coefficient of the scraper machine, and the temperature of a friction surface of the middle trough can be calculated by using the computer in the following calculation manner:

A calculation formula of the overall frictional force is as follows:

$$F = \sum_{x=1}^{n} \frac{s*(f_{x1} + f_{x2} + f_{x3})}{3s_1}$$

wherein:
F denotes the overall frictional force;
n denotes the number of the segments of the scraper machine;
s denotes an effective conveying area of each of the segments of the scraper machine;
$s_1$ denotes the area of each of the force receiving modules; and
$f_{x1}$, $f_{x2}$, and $f_{x3}$ denote tangential friction forces output by the sensor.

A calculation formula of the overall load capacity is as follows:

$$M = \sum_{x=1}^{n} \frac{s*(F_{x1} + F_{x2} + F_{x3})}{3s_1 * g}$$

wherein:

M denotes the overall load capacity;

n denotes the number of the segments of the scraper machine;

s denotes an effective conveying area of each of the segments of the scraper machine;

$s_1$ denotes the area of each of the force receiving modules; and $F_{x1}$, $F_{x2}$, and $F_{x3}$ denote positive pressures output by the sensor.

The average friction coefficient is calculated as follows:

$$\mu = \frac{F}{Mg}.$$

The calculated temperature of the friction surface is an average value of temperatures measured by all the pre-embedded temperature sensors.

When the scraper machine is overloaded or the temperature of the friction surface of the middle trough is abnormal, the PLC control system controls the frequency converter 13 to stop operation of the electric motor 8. In addition, operation health evaluation can be performed on the scraper machine by using the calculated friction coefficient. When the friction coefficient or its fluctuation range is relatively large, it indicates that the working conditions of the middle trough are relatively severe, and overhaul or replacement is timely required for the middle trough of the scraper machine.

Based on the overall load capacity, the overall frictional force, the friction coefficient, and the temperature of the friction surface that are calculated by the data processing system, a data basis for studying friction wear between the middle troughs of the scraper machine and the coal bulk can be provided.

What is claimed is:

1. A frictional force monitoring system for middle troughs of a scraper conveyor, comprising: in each of the middle troughs of the scraper conveyor, three rectangular through holes being provided at equal intervals along a running direction with a central line of the middle trough as a reference, wherein a rectangular force receiving module is mounted in each of the rectangular through holes and the rectangular force receiving modules match the rectangular through hole in shape, and an upper surface of the rectangular force receiving module coincides with an upper surface of the middle trough;

a three-dimensional force sensor is disposed between the force receiving module and the bottom of the middle trough, a counterbore is provided in the upper surface of each of the force receiving modules, and the force receiving module is connected to the three-dimensional force sensor at the bottom of the middle trough in the counterbore; a sealing cap is disposed on a top of the counterbore, and an upper surface of the sealing cap coincides with an upper surface of the force receiving module;

a temperature sensor is pre-embedded in each of the force receiving modules;

a controller is in signal connection with the three-dimensional force sensor and the temperature sensor via a data acquisition card;

the three-dimensional force sensor and the temperature sensor are configured to achieve multi-point interconnected monitoring, thermal and force data about the middle trough during operation of the scraper conveyor is obtained in real time, and a fault position in the scraper conveyor is determined according to exceptional data in the following manner:

the sensors are grouped, each group of sensors is numbered and the positions of each group are marked, tangential friction forces is measured by the three-dimensional force sensor and temperature is measured by the pre-embedded temperature, if data is excessively large or small at a certain position, the frictional force monitoring system determines according to the number and position of a data exception group, that the scraper conveyor has a fault at this position;

according to data monitored by the multiple arranged force receiving modules, an overall load capacity, overall frictional force, and average friction coefficient of the scraper conveyor, and a temperature of a friction surface of the middle trough are calculated by using a computer of the frictional force monitoring system in the following calculation manner:

a calculation formula of the overall frictional force is as follows:

$$F = \sum_{x=1}^{n} \frac{s*(f_{x1} + f_{x2} + f_{x3})}{3s_1}$$

wherein:

F denotes the overall frictional force;

n denotes the number of the segments of the scraper conveyor;

s denotes an effective conveying area of each of the segments of the scraper conveyor;

$s_1$ denotes the area of each of the force receiving modules; and $f_{x1}$, $f_{x2}$, and $f_{x3}$ denote tangential friction forces output by the three-dimensional force sensor; and a calculation formula of the overall load capacity is as follows:

$$M = \sum_{x=1}^{n} \frac{s*(F_{x1} + F_{x2} + F_{x3})}{3s_1 * g}$$

wherein:

M denotes the overall load capacity;

n denotes the number of the segments of the scraper conveyor;

s denotes an effective conveying area of each of the segments of the scraper conveyor;

$s_1$ denotes the area of each of the force receiving modules; and $F_{x1}$, $F_{x2}$, and $F_{x3}$ denote positive forces output by the sensor.

2. The frictional force monitoring system for the middle troughs of the scraper conveyor according to claim 1, wherein the average friction coefficient is calculated as follows:

$$\mu = \frac{F}{Mg};$$

and
- a calculated temperature of the friction surface is an average value of temperatures measured by all the pre-embedded temperature sensors.

3. The frictional force monitoring system for the middle troughs of the scraper conveyor according to claim 1, wherein the force receiving module is a rectangular steel block having the same material as the middle trough.

4. The frictional force monitoring system for the middle troughs of the scraper conveyor according to claim 1, wherein a scraper conveyor comprises scrapers, a double chain, a sprocket, a speed reducer, an electric motor, and a frequency converter; the frequency converter is connected to the electric motor; the speed reducer is connected between the electric motor and the sprocket; the sprocket engages with the double chain; and the scrapers are mounted on an upper surface of the double chain at equal intervals; and
- the frequency converter is electrically connected to the controller.

* * * * *